No. 840,580. PATENTED JAN. 8, 1907.
M. A. McMILLAN.
COMBINED NAIL PULLER AND BAND CUTTER.
APPLICATION FILED JULY 31, 1906.
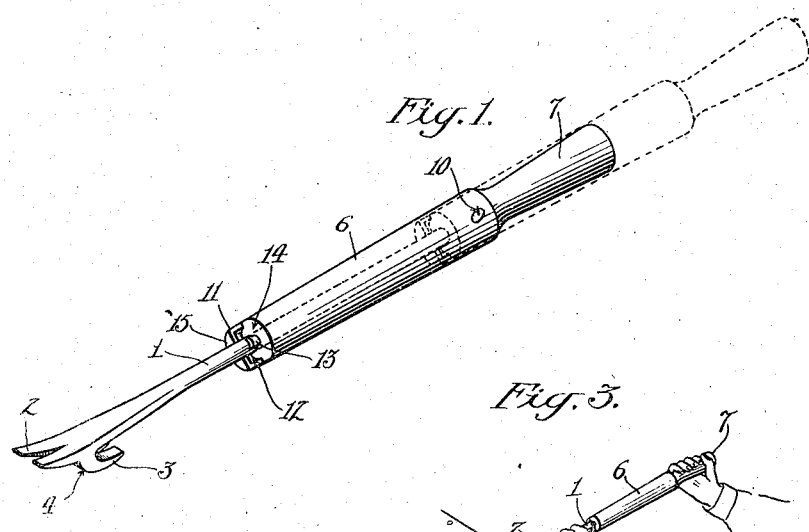
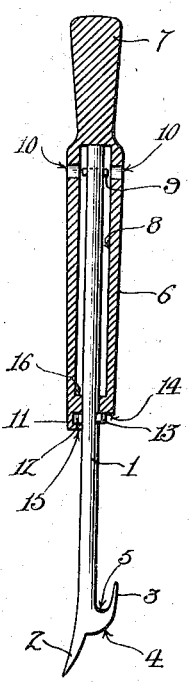
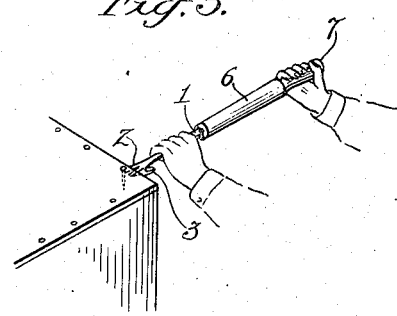
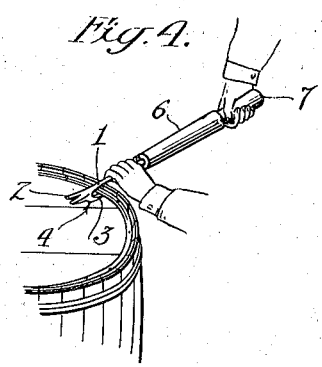
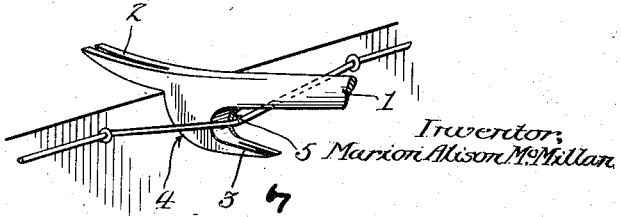
Witnesses:
Frank L. Graham
Geneva L. Smith
Inventor:
Marion Alison McMillan
Townsend & Hackley & Wright
Atty.

UNITED STATES PATENT OFFICE.

MARION ALISON McMILLAN, OF STEDMAN, CALIFORNIA.

COMBINED NAIL-PULLER AND BAND-CUTTER.

No. 840,580.  Specification of Letters Patent.  Patented Jan. 8, 1907.

Application filed July 31, 1906. Serial No. 328,626.

*To all whom it may concern:*

Be it known that I, MARION ALISON Mc-MILLAN, a citizen of the United States, residing at Stedman, in the county of San Bernardino, State of California, have invented a new and useful Combined Nail-Puller and Band-Cutter, of which the following is a specification.

This invention relates to combined tools, particularly to a tool for pulling nails and cutting wires or bands on barrels, boxes, crates, &c.

One object of the invention is to provide a combination nail-puller and wire-cutter with claws adapted to grab nails from either side of a fulcrum-point without reversing the tool, thereby greatly expediting the work.

Another object is to provide for ramming the claws in either direction.

Another object is to lock the ram rigidly with the shank of the tool when desired to form a rigid tool throughout, with no loose parts, thus avoiding rattling and making the tool much easier to handle for many purposes.

Another object is to provide a wire or band cutter to coöperate with a fulcrum on the tool, which fulcrum also coöperates with either claw.

The accompanying drawings illustrate the invention.

Referring to the drawings, Figure 1 is a perspective view of the device, the dotted lines indicating the extended position of the ram and handle. Fig. 2 is a longitudinal section taken diametrically through the device, the shank and claws being shown in elevation. Fig. 3 is a perspective view, showing one manner of using the tool in drawing nails from boxes. Fig. 4 is a perspective view showing the manner of using the tool in removing the inner or head-retaining hoop of a barrel. Fig. 5 is a perspective view, enlarged, of the claw portion of the device, showing the operation of cutting a wire.

The device comprises a shank 1, on the end of which is formed what will be termed the "outer" claw 2. An inner claw 3 is formed on the under side of the shank 1, near the outer claw 2, and is hook-shaped and provided with a curved bearing-surface 4, forming a fulcrum which comes into play when using either the outer claw 2 or the inner claw 3. A knife 5, with a concave edge, is formed underneath the shank 1 at one side of the concave portion of the claw 3, as clearly shown in Fig. 5.

Slidably mounted on the shank 1 is a ram 6, on the outer end of which is formed a handle 7. The ram 6 has a cylindrical recess 8 to permit play of a pin 9, carried by the inner end of the shank 1. The ram 6 is drilled to form perforations 10, which allow the pin 9 to be driven into the shank 1 in assembling the parts. The lower end of the ram 6 is provided with a semicircular hood 11, having a concave recess or pocket 12. Formed on shank 1 is a lug 13, which is adapted to seat in the pocket 12 when the lug is in alinement with the pocket and the shank is turned relatively to the ram. When the lug is seated in the pocket 12, the shank 1 is locked rigidly with the ram and handle, so that the parts of the tool are rigidly and compactly locked together. By turning the ram and handle about one-half way around the lug 13 may be disengaged from the pocket 12, so that the ram may be slid longitudinally of the shank 1 to pound the inner end of the ram against the end of the shank to force the outer claw 2 under the head of a nail or other thing which is to be pried up. In this pounding action of the ram, abutment 14 might also contact with the lug 13, or the abutment 15, which is the end face of the hood 11, might take the force of the blow if the shank became turned while extended so that the lug stood in line with abutment 15.

When the device is to be used with the inner claw 3, for example, in prying up the inner hoop of a barrel, as indicated in Fig. 4, the tool may be locked together and the claw squeezed under the hoop or the ram may be unlocked and operated in a reverse direction, pounding the pin 9 against an abutment 16, formed by the recess 8, which will thus drive in the claw 3.

It is advantageous for ordinary purposes to lock the shank to the ram when simply prying with either claw or using the knife.

The fulcrum 4 being situated between the two claws operates when the knife is being used—for example, in cutting a wire, as shown in Fig. 5. The outer claw 2 also serves as a fulcrum at times for either the inner claw or knife when a long sweep of the handle in tilting the tool lifts the fulcrum above its support. The inner claw 3 serves to guide the knife to the wire and holds the knife against slipping away from the wire.

The knife can be operated with a sawing action against the wire or can be forcibly driven against the wire by outward ramming movement of the ram, or the knife can be manipulated by a combination of these ramming and sawing operations.

What I claim is—

1. A combination-tool comprising a shank, outer and inner claws on the shank with a bearing-face between the claws forming a fulcrum for both claws, and a ram slidable on the shank for driving the shank in either direction.

2. A combination-tool comprising a shank, outer and inner claws on the shank with a bearing-face between the claws forming a fulcrum for both claws, a ram slidable on the shank for driving the shank in either direction, and means for locking the ram from movement on the shank.

3. A combination-tool comprising a shank, outer and inner claws on the shank with a bearing-face between the claws forming a fulcrum for both claws, a ram slidable on the shank for driving the shank in either direction, and means operated by turning the ram relatively to the shank for locking the ram from movement on the shank.

4. A combination-tool comprising a shank, outer and inner claws on the shank with a bearing-face between the claws forming a fulcrum for both claws, a knife formed in the angle between the inner claw and shank, and a ram slidable on the shank to drive the knife or claws.

5. A combination-tool comprising a shank, an outer claw formed on the end of the shank, an inner hook-shaped claw extending in the opposite direction formed on the shank, a knife formed at one side of the inner claw between the claw and shank, the shank having a curved bearing-face between the two claws and forming a fulcrum for either claw or said knife, and a ram slidable on the shank to drive the knife or claws.

6. A combination-tool comprising a shank, an outer claw formed on the end of the shank, an inner hook-shaped claw extending in the opposite direction formed on the shank, a knife formed at one side of the inner claw between the claw and shank, the shank having a curved bearing-face between the two claws and forming a fulcrum for either claw or said knife, and a ram slidable on the shank for driving the shank in either direction.

7. A combination-tool comprising a shank, outer and inner claws on the shank with a bearing-face between the claws forming a fulcrum for both claws, a ram slidable on the shank, a hood formed on one end of the ram, the shank having a lug adapted to engage in the hood when the shank is turned relatively to the ram.

8. A combination-tool comprising a shank, outer and inner claws on the shank with a bearing-face between the claws forming a fulcrum for both claws, a ram slidable on the shank, a hood formed on one end of the ram, the shank having a lug adapted to engage in the hood when the shank is turned relatively to the ram, the ram having an elongated cylindrical recess, the shank having a projection protruding into said recess and adapted to receive impact from an abutment on the ram at one end of the recess.

9. A combination-tool comprising a shank, outer and inner claws on the shank with a bearing-face between the claws forming a fulcrum for both claws, a ram slidable on the shank, a hood formed on one end of the ram, the shank having a lug adapted to engage in the hood when the shank is turned relatively to the ram, the ram having an elongated cylindrical recess, a pin in the shank projecting into the recess and adapted to receive impact from an abutment on the ram at one end of the recess, the ram having a perforation for permitting the assembling of the pin in the shank.

10. A combination-tool comprising a shank, outer and inner claws on the shank with a bearing-face between the claws forming a fulcrum for both claws, a ram slidable on the shank for driving the shank in either direction, and a handle formed on the end of the ram.

In testimony whereof I have hereunto set my hand, at Los Angeles, California, this 25th day of July, 1906.

MARION ALISON McMILLAN.

In presence of—
GEORGE T. HACKLEY,
FRANK L. A. GRAHAM.